US006144705A

United States Patent [19]

Papadopoulos et al.

[11] Patent Number: 6,144,705

[45] Date of Patent: *Nov. 7, 2000

[54] TECHNIQUE FOR SIMULTANEOUS COMMUNICATIONS OF ANALOG FREQUENCY-MODULATED AND DIGITALLY MODULATED SIGNALS USING PRECANCELING SCHEME

[75] Inventors: Haralabos C. Papadopoulos, Allston, Mass.; Carl-Erik Wilhelm Sundberg, Chatham, N.J.

[73] Assignee: Lucent Technologies Inc., Murray Hill, N.J.

[ * ] Notice: This patent issued on a continued prosecution application filed under 37 CFR 1.53(d), and is subject to the twenty year patent term provisions of 35 U.S.C. 154(a)(2).

[21] Appl. No.: 08/704,470

[22] Filed: Aug. 22, 1996

[51] Int. Cl.[7] .......... H04L 25/49

[52] U.S. Cl. .......... 375/296

[58] Field of Search .......... 375/260, 285, 375/307, 299, 206, 271, 275, 278, 296

[56] References Cited

U.S. PATENT DOCUMENTS 4,379,947 4/1983 Warner .......... 370/204
5,301,363 4/1994 Hinderks .......... 375/346
5,757,854 5/1998 Hunsinger et al. .......... 375/269

OTHER PUBLICATIONS

"FM-2 System Description", USA Digital Radio, 1990–1995.

N. Jayant, "The AT&T DAR System Update", *NAB 1994 Broadcasting Engineering Conference Proceedings,* pp. 389–398.

J. Bingham, "AT&T/AMATI DAR System: An Update", *NAB 1994 Broadcast Engineering Conference Proceedings,* pp. 399–403.

*Primary Examiner*—Stephen Chin
*Assistant Examiner*—Albert Park

[57] ABSTRACT

In a system for simulcasting digitally modulated and analog FM signals over the same FM frequency band, the effect of the analog FM signal on the digitally modulated signal in the simulcast is calculated and canceled from the latter signal before its transmission. As a result, the digital transmission is free from interference from the analog FM signal. Moreover, the digital transmission is designed in such a manner that the interference caused thereby to the analog FM signal is kept at a minimal level.

40 Claims, 7 Drawing Sheets

TECHNIQUE FOR SIMULTANEOUS COMMUNICATIONS OF ANALOG FREQUENCY-MODULATED AND DIGITALLY MODULATED SIGNALS USING PRECANCELING SCHEME

FIELD OF THE INVENTION

The invention relates to systems and methods for communications using analog and digitally modulated signals, and more particularly to systems and methods for simulcasting digitally modulated and analog frequency-modulated (FM) signals over an FM frequency band.

BACKGROUND OF THE INVENTION

The explosive growth of the digital communications technology has resulted in an ever-increasing demand for bandwidth for communicating digital data. Because of the scarcity of available bandwidth for accommodating additional digital communications, the industry recently turned its focus on the idea of utilizing the preexisting analog FM band more efficiently to help make such accommodation. However, it is required that any adjustment to the FM band utilization do not significantly affect the performance of the analog FM communications.

A licensing authority grants FM broadcast stations licenses to broadcast on different carrier frequencies. The separation of these carrier frequencies is 200 KHz and are reused geographically. However, in order to accommodate for the fairly gradual power reduction at the tails of the spectrum of an analog FM signal, closely located stations are licensed to use frequency bands separated by typically at least 800 KHz. The following provides background information on FM communications:

Analog FM Background

Let m(t) denote a modulating signal in FM modulation. The FM carrier $f_c$ after it is modulated by m(t) results in the following FM modulated signal $x_{FM}$:

$$x_{FM}(t) = \cos\left(2\pi f_c t + 2\pi f_d \int_{-\infty}^{t} m(\tau) d\tau\right),$$

with the assumption that $$\max_t |m(t)| = 1,$$

where $f_d$ corresponds to the maximum frequency deviation.

In the commercial FM setting, $f_d$ is typically 75 KHz, and m(t) is a stereo signal derived from left and right channel information represented by L(t) and R(t) signals, respectively. The latter are processed by pre-emphasis filters to form $L_p(t)$ and $R_p(t)$, respectively. The frequency response ($H_p(f)$) of such filters is:

$$H_p(f) = \frac{1 + j(f/f_1)}{1 + j(f/f_2)},$$

where typically $f_1$=2.1 KHz, and $f_2$=25 KHz.

The stereo signal, m(t), is then generated according to the following expression:

$$m(t)=a_1[L_p(t)+R_p(t)]+a_2 \cos(4\pi f_p t)[L_p(t)-R_p(t)]+a_3 \cos(2\pi f_p t),$$

where typically $2f_p$=38 KHz, $a_1=a_2$=0.4, and $a_3$=0.1. The rightmost term, $a_3 \cos(2\pi f_p t)$, in the above expression is used by FM receivers to coherently demodulate the passband term involving the difference of the left and right signal, and is generally referred to as the "Pilot Signal."

A conventional FM receiver includes a device for deriving an angle signal from the received version of $x_{FM}(t)$. A mathematical derivative operation of this angle signal provides $\hat{m}(t)$, an estimate of m(t). For monophonic receivers, a lowpass filter is used to obtain an estimate of the $[L_p(t)+R_p(t)]$. Stereo receivers use the pilot signal to demodulate $[L_p(t)-R_p(t)]$, which is then linearly combined with the estimate of $[L_p(t)+R_p(t)]$ to obtain $\hat{L}_p(t)$ and $\hat{R}_p(t)$, the estimates of $L_p(t)$ and $R_p(t)$, respectively. These estimates are then processed by a deemphasis filter having the following frequency response $H_d(f)$ to obtain the estimates of the left and right signals at the transmitter:

$$H_d = \frac{1}{1 + j(f/f_1)}.$$

Prior Art Techniques

A number of techniques have been proposed to achieve the aforementioned goal of simulcasting digital data and analog FM signals using a preexisting FM band. One such technique referred to as an "In Band Adjacent Channel (IBAC)" scheme involves use of an adjacent band to transmit the digital data. FIG. 1 illustrates the relative location of the IBAC for digital broadcast in accordance with this scheme to the power spectrum of a host analog FM signal in the frequency domain. As shown in FIG. 1, the center frequencies of the IBAC and the host signal are, for example, 400 KHz apart. However, the implementation of the IBAC scheme requires a new license from the licensing authority. In addition, in a crowded market like a large populous city in the United States, the transmission power level using the IBAC scheme needs to be kept low to have minimal interference with other channels. As a result, the IBAC scheme may not afford broad geographic coverage of the digitally modulated signal. However, digital transmission is more robust than analog FM transmission, thus leading to broader coverage with digital transmission if the power levels of the two transmissions are equal. The actual coverage depends on the location of the transmitter and interference environment.

When the IBAC scheme is utilized with removal of existing analog FM transmitters, an in-band reserved channel (IBRC) scheme emerges. In accordance with the IBRC scheme, the power level of digital transmission is comparable to that of analog FM transmission, resulting in at least as broad a digital coverage as the FM coverage. By successively replacing analog FM transmitters with IBAC/IBRC transmitting facilities, a migration from a 100% analog to a 100% transmission of audio information over the FM band is realized.

Another prior art technique is referred to as an "In Band on Channel (IBOC)" scheme. Referring to FIG. 2, in accordance with this scheme, digital data is transmitted in bands adjacent to and on either side of the power spectrum of the host analog FM signal, with the transmission power level of the digitally modulated signal significantly lower than that of the FM signal. As shown in FIG. 2, the relative power of the digitally modulated signal on the IBOC to the host signal is typically 25 dB lower. Unlike the IBAC scheme, the current FM license is applicable to implementing the IBOC scheme, provided that the transmission power level of the digitally modulated signal satisfy the license requirements.

Because of the requirement of the low power transmission level of the digitally modulated signal, the IBOC scheme may also be deficient in providing broad geographic coverage of same, more so than the IBAC scheme. As discussed hereinbelow, broad coverage of transmission pursuant to the IBOC scheme without an analog host is achievable using a relatively high transmission power level. As such, a migration from a 100% analog to a 100% digital transmission of audio information over the FM band is again realizable.

Other prior art techniques include one that involves use of a frequency slide scheme where the center frequency of digital modulation is continuously adjusted to follow the instantaneous frequency of a host FM waveform. According to this technique, while the spectra of the analog and digital waveforms overlap, the signals generated never occupy the same instantaneous frequency, thereby avoiding interference of the digitally modulated signal with the host analog FM signal. For details on such a technique, one may be referred to: "FM-2 System Description", USA Digital Radio, 1990–1995. However, the cost of a system implementing the technique is undesirably high as its design is complicated, and the system is required to be of extremely high-speed in order to react to the constantly changing instantaneous frequency of the host FM waveform.

Accordingly, it is desirable to have an inexpensive system whereby digitally modulated signals can be simulcast with host analog FM signals, with broad coverage of the digitally modulated signals and virtually no interference between the digitally modulated signals and the FM signals.

SUMMARY OF THE INVENTION

In accordance with the invention, a host analog FM signal representing analog data and a digitally modulated signal representing digital data are communicated over an allocated FM frequency band. The analog FM signal and a modified version of the digitally modulated signal are simultaneously transmitted over the FM band. The digitally modulated signal is modified to account for the effect of the FM signal on the modified signal when they are simultaneously transmitted. This effect is canceled from the digitally modulated signal before the transmission. As a result, the digital transmission is free from interference from the analog transmission and affords a broad coverage. In addition, the rate and power level of digital transmission are selected in such a manner that the interference caused by the digital transmission to the analog transmission is kept at an acceptably low level.

DETAILED DESCRIPTION

Figure 3:
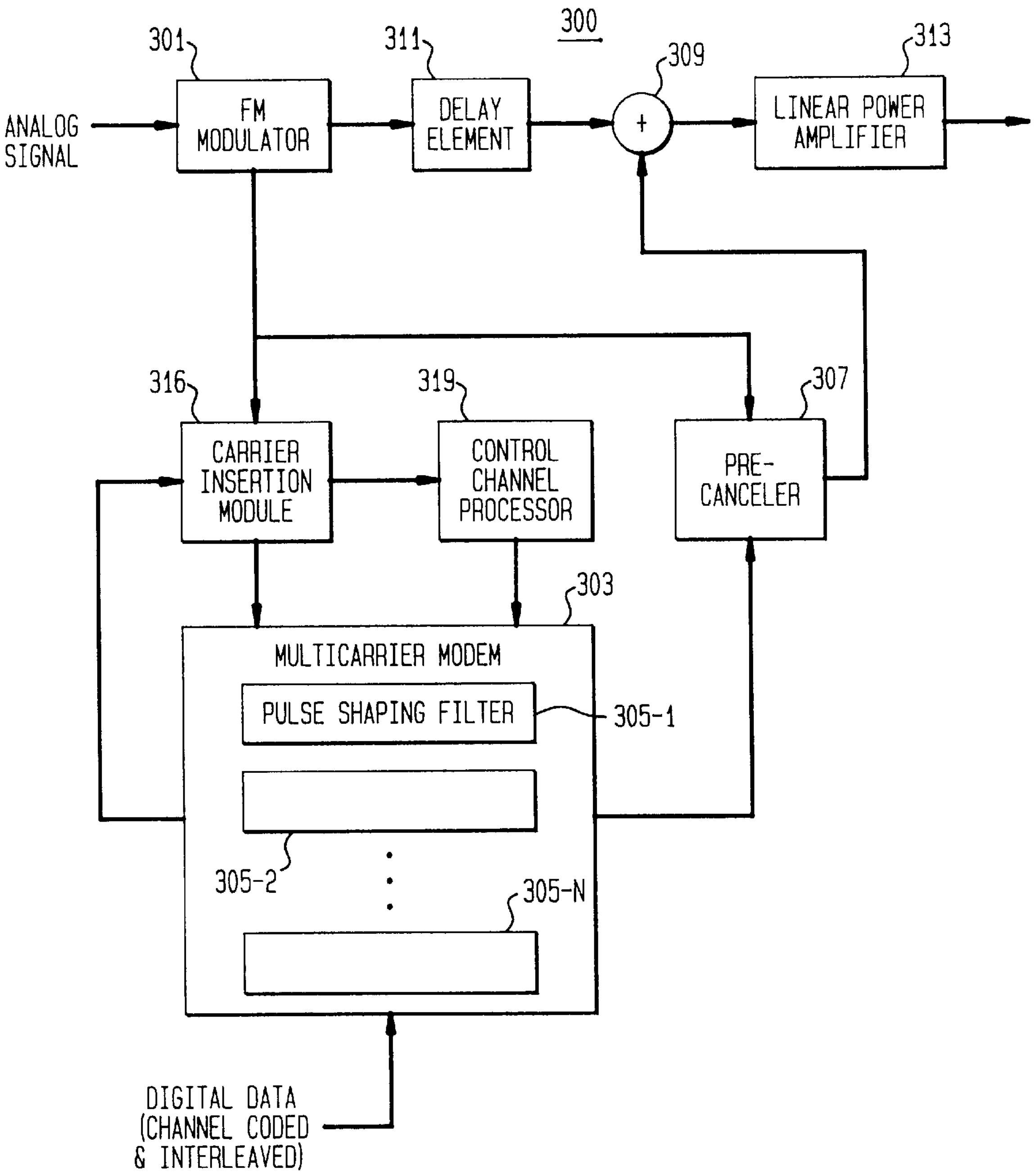
FIG. 3 is a block diagram of a transmitter for transmitting digitally modulated and analog FM signals in accordance with the invention.

FIG. 3 illustrates transmitter 300 for simulcasting digitally modulated signals and analog FM signals in accordance with the invention. FM modulator 301, which may reside in a FM radio station, in a standard way generates a stereo FM signal in response to an analog input signal. The FM signal is to be transmitted over a frequency band, which in this instance is 200 KHz wide, allocated to the FM broadcast. Transmitter 300 is also used to transmit digital data in accordance with an inventive scheme to be described which is an improvement over the prior art IBOC scheme. Like the latter, the inventive scheme may be used to transmit digital data outside the host FM signal band. However, in a significant departure from the prior art scheme, the inventive scheme may also be used to transmit over the same FM band both digitally modulated and host analog FM signals.

One of the objectives of the invention is to allow an FM receiver to process the host analog FM signals in a conventional manner and provide virtually undeteriorated FM quality, despite the fact that the FM signals sharing the same frequency band with the digitally modulated signals. To that end, digitally modulated signals are inserted in the host FM band at low enough power levels to avoid causing significant co-channel interference at the FM receiver.

Coverage of digitally modulated signals transmitted at a low power level is normally limited. However, the inventive scheme improves such coverage. In addition, the inventive scheme includes a precanceling scheme whereby the interference which would otherwise be caused by the host analog FM signal at a digital data receiver is precanceled.

In accordance with the precanceling scheme, cancellation or elimination of a calculated response of the analog FM signal from the digitally modulated signal is performed at transmitter 300. Since the waveform of the FM signal is a priori known at the transmitter, the precancelation is achievable by eliminating from the digitally modulated signal, before its transmission, the effect of the FM signal with which the digitally modulated signal is to be simulcast. Thus, with the precanceling scheme, the digital data transmission, though sharing the same band with the analog FM transmission, is devoid of interference from the analog FM signal at the digital data receiver and subject only to the background noise.

In transmitter 300, digital data is transmitted pursuant to an adaptive orthogonal frequency division multiplexed scheme. To that end, digital data is input at multicarrier (or multitone) modem 303, which provides multiple carrier frequencies or tones for digital data transmission. The input digital data are channel coded and interleaved in a conventional manner to become more immune to channel noise.

The digital data transmission by multicarrier modem 303 is achieved using N pulse shaping tones or carriers, each occupying a subband having a bandwidth of 200/N KHz, where N is a predetermined integer having a value greater than 1. Accordingly, modem 303 includes N pulse shaping filters, denoted 305-1 through 305-N, each associated with a different carrier.

The digital data to be transmitted is represented by data symbols. In accordance with the invention, modem 303 transmits the data symbols on a frame-by-frame basis, with each frame containing M symbols, where M is a predetermined integer having a value greater than 0.

Figure 4:
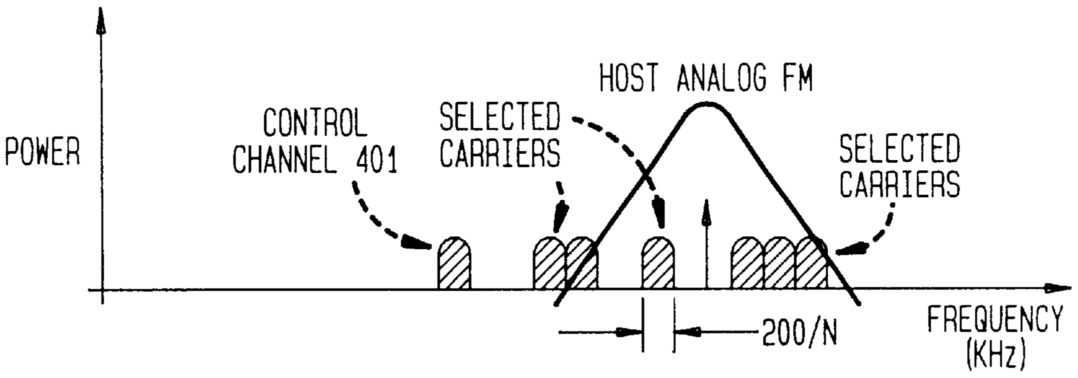
FIG. 4 illustrates a composite power spectrum of the digitally modulated and analog FM signals transmitted by the transmitter of FIG. 3 during a given time frame.

Within each frame only a subset of carriers of modem 303 are used for digital data transmission. FIG. 4 shows such a subset populating the FM band during a particular frame. The frequencies and number of carriers in the subset vary from frame to frame, and are selected to minimize the interference caused by the digital data transmission to the host analog FM signal.

Without loss of generality, let's assume that only the n-th carrier is used in the current frame, which starts at time t=0, and $I_n[0], \ldots, I_n[M-1]$ respectively represent the M symbols allocated to that frame, where $1 \leqq n \leqq N$. The corresponding digitally modulated signal to be transmitted on the n-th carrier may then be represented by $d_n(t)$ as follows:

$$d_n(t) = \sum_{k=0}^{M-1} I_n[k]h_n(t-kT),$$

where $h_n(t)$ represents the impulse response of pulse shaping filter 305-n associated with the n-th carrier. If this were the only signal transmitted in the signal space direction defined by $h_n(t)$, the digital receiver would obtain the following data symbols represented by $\hat{I}_n(k)$, assuming perfect time and carrier synchronization and an absence of inter-symbol interference and other impairments:

$$\hat{I}_n[k]=y(t)*h_n^*(-t)|_{t=kT},$$

where $0 \leqq k \leqq M-1$; y(t) represents the received digitally modulated signal on the FM band; and $h_n^*(t)$ represents the complex conjugate of $h_n(t)$. However, the host analog FM signal, represented by $x_{FM}(t)$, is also transmitted on the same band. As such, the analog signal would make a non-zero contribution to the received symbol. Such a contribution is represented by $c_n[k]$ as follows:

$$c_n[k]=x_{FM}(t)*h_n^*(-t)|_{t=kT}.$$

Thus, if $$y(t)=x_{FM}(t)+d_n(t)+w(t),$$

where w(t) represents noise from other sources, then $$\hat{I}_n[k]=I_n[k]+c_n[k]+z_n[k],$$

where $z_n[k]$ is attributed to the noise w(t) and can be expressed as follows:

$$z_n[k]=w(t)*h_n^*(-t)|_{t=kT}.$$

Since the digitally modulated signal is transmitted by the transmitter (i.e., transmitter 300) which also transmits the host analog FM signal $x_{FM}(t)$, using the knowledge of the waveform of the FM signal, precanceler 307 is capable of computing $c_n[k]$'s at the cost of a short delay. Using the computed results, precanceler 307 then precancels the effect that the FM signal would otherwise have on the digitally modulated signal when the two signals are simulcast over the same band. The precanceled digitally modulated signal at the output of precanceler 307 can be represented by $d_n(t)+a_n(t)$, where $$a_n(t) = \sum_{k=0}^{M-1} -c_n[k]h_n(t-kT).$$

The precanceled digitally modulated signal is applied to adder 309 where the precanceled signal is added to a delayed version of the host FM analog signal. The latter comes from the output of delay element 311 which injects into the analog FM signal a delay as long as that incurred by precanceler 307 in computing $c_n[k]$'s. Similarly, other delays may be introduced into various components of circuit 300 to better synchronize their operations, and should be apparent to a person skilled in the art in implementing the invention as disclosed.

The output of adder 309 can be expressed as $x(t)=x_{FM}(t)+d_{n(t)+an}(t)$. Equivalently, $$x(t)=x_{FM}(t)+\partial_n(t),$$

where $$\tilde{d}_n(t) = \sum_{k=0}^{M-1} (I_n[k]-c_n[k])h_n(t-kT). \quad (1)$$

Thus, if y(t)=x(t)+w(t), the symbol estimates are $$\hat{I}_n[k]=c_n[k]+(I_n[k]-c_n[k])+z_n[k]=I_n[k]+z_n[k]$$

In general, a subset S of the N carriers in multicarrier modem 303 is selected. In that case the output of adder 309 (x(t)) can be generically represented as follows:

$$x(t)=x_{FM}(t)+d(t),$$

where d(t) represents the aggregate digitally modulated signal and can be expressed as follows:

$$d(t) = \sum_{n \in S} \tilde{d}_n(t)$$

and where $\tilde{d}_n(t)$ is given by expression (1) above for each value of n.

The output of adder 309 is applied to linear power amplifier 313 of conventional design. The latter transmits an amplified version of the composite signal x(t) over the allocated FM frequency band.

The manner in which the subset S of the N carriers in modem 303 is selected for digital data transmission will now be described. The precanceling scheme described above guarantees that the digital data is transmitted without interference from the host analog FM signal. However, the host analog FM signal may be significantly affected by the digitally modulated signal using such a scheme. Thus, one of the objectives of the invention is to select: as large a subset (S) of the carriers as possible while the total degradation incurred to the host analog FM signal is kept at an acceptable level.

One way to evaluate this degradation is by simulating an analog FM receiver. Let L(t) and R(t) respectively denote the left and right channel estimates of the analog FM receiver subject to an input $x(t)=x_{FM}(t)+d(t)$. Given the values of L(t) and R(t) which are available at transmitter 300, $\hat{L}(t)$ and $\hat{R}(t)$ can be predetermined whether they are of acceptable quality. By way of example, but not limitation, the figure of merit (γ) used in this particular embodiment is defined as follows:

$$\gamma = \frac{\int_{time-frame} \left[L(t) - \hat{L}(t)\right]^2 dt + \int_{time-frame} \left[R(t) - \hat{R}(t)\right]^2 dt}{\int_{time-frame} L^2(t)dt + \int_{time-time} R^2(t)dt}.$$

The subset (S) of carriers are selected by carrier insertion module 316 on a time-frame by time-frame basis. Module 316 runs an insertion algorithm to turn on as many carriers as possible during each frame, subject to a preselected constraint, $\gamma_{max}$, representing the maximum acceptable degradation to the host analog FM signal. The precancelation effect of each selected carrier on the FM signal is taken into consideration in the insertion algorithm.

Figure 5:
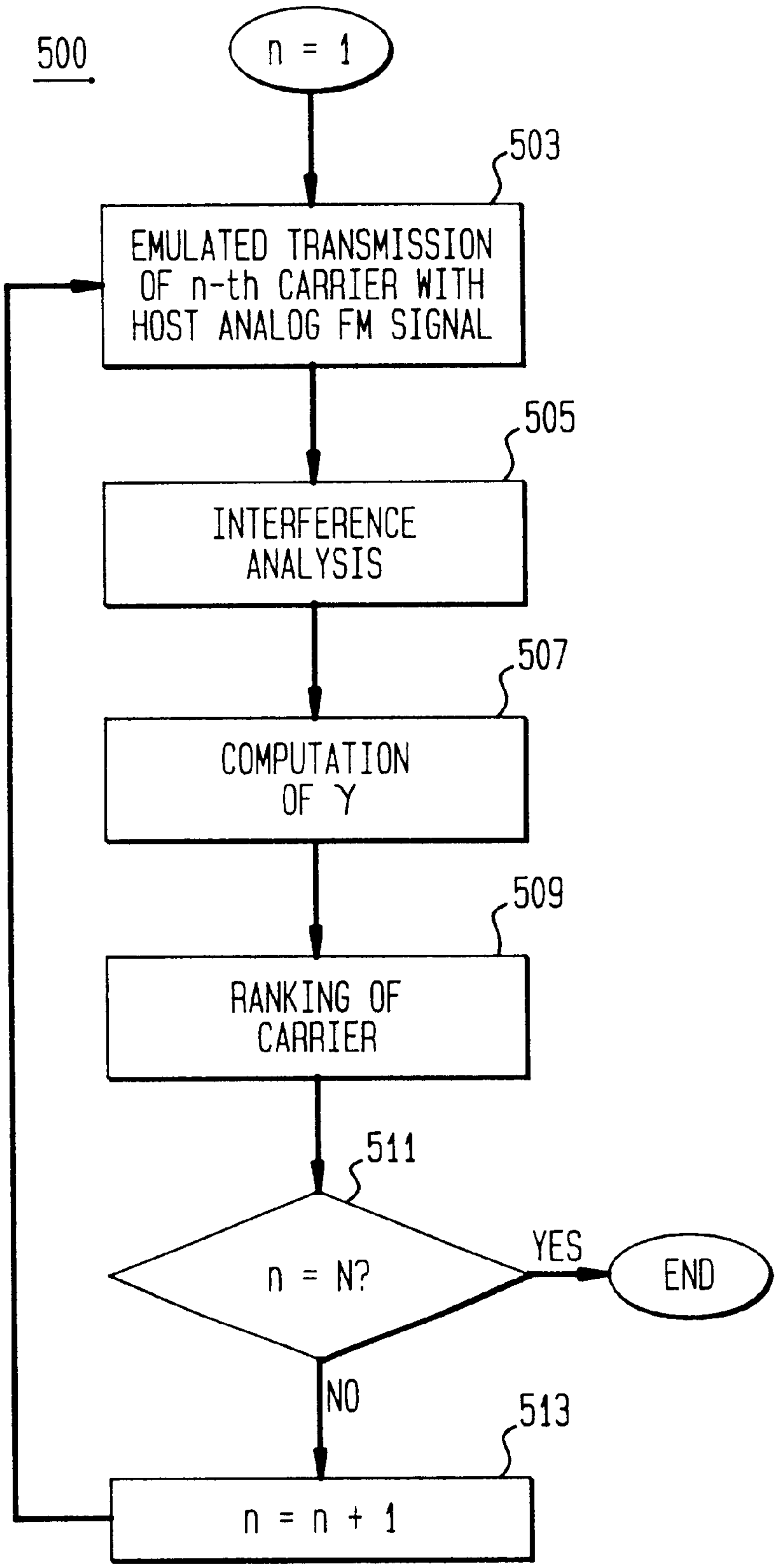
FIGS. 5 and 6 are flow charts depicting the steps of selecting carriers for digital transmission by transmitter of FIG. 3.
Figure 6:
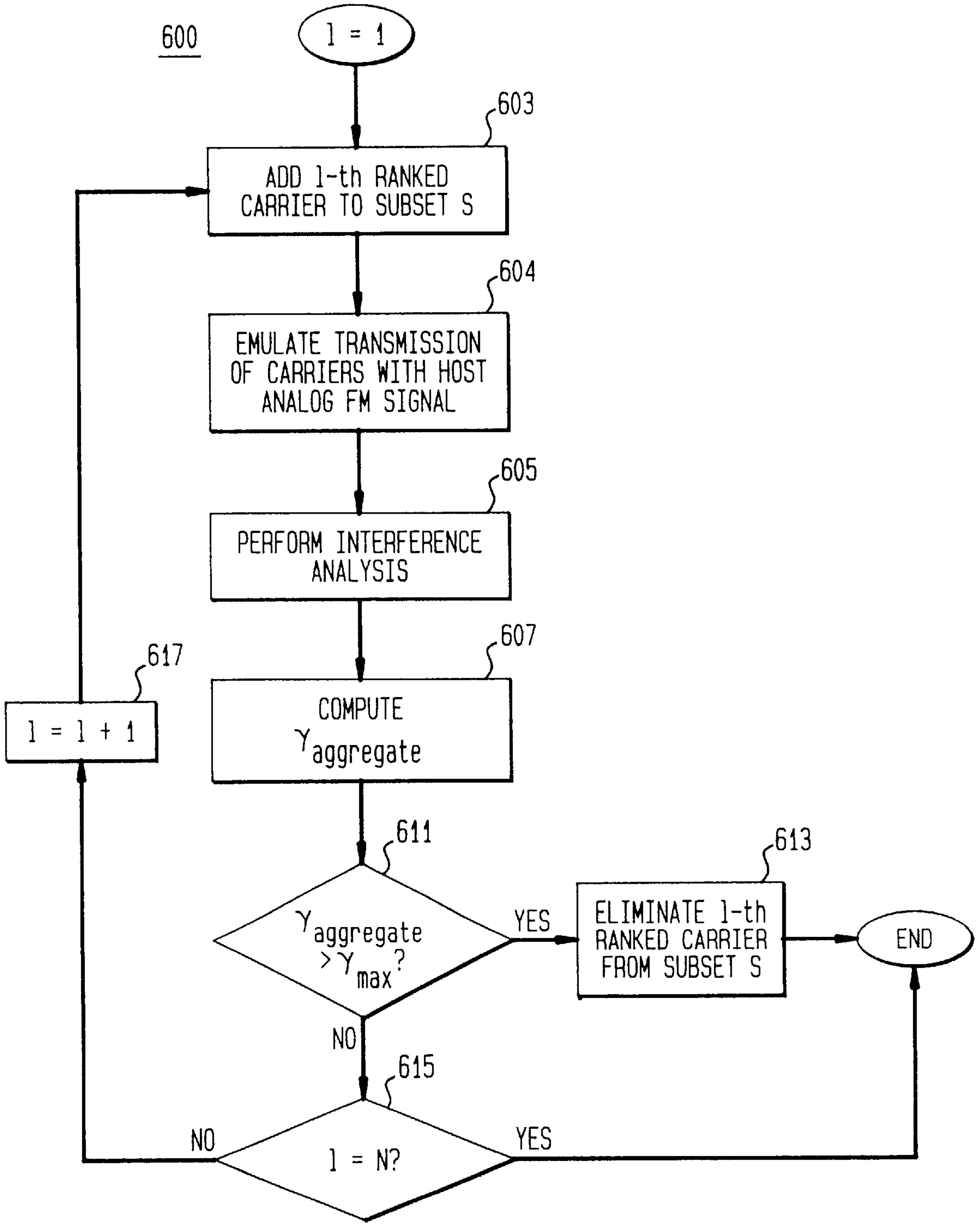

The insertion algorithm for each time frame comprises carrier pre-ranking process 500 and carrier selection process 600, which are depicted in FIGS. 5 and 6, respectively. Turning to FIG. 5, in pre-ranking process 500, each n-th carrier, for n=1, 2 . . . , N, in modem 303 takes turn in emulating its transmission with the host analog FM signal, as indicated at step 503 where n=1 initially. At step 505, an interference analysis of the emulated transmission of the current carrier together with the FM signal is performed by carrier insertion module 316. In this particular embodiment, the carrier contains random digital data in the emulated transmission. However, in an alternative embodiment, the carrier contains the actual digital data to be transmitted in the emulation. In that embodiment, although the emulation would be more realistic, the bookkeeping of each carrier for the associated data used in the emulation is necessary. The above interference analysis also takes into account the precancelation effect of the current carrier on the FM signal. Based on the interference analysis, the value of γ corresponding to the carrier in the time frame under consideration is computed at step 507. The current carrier is then ranked among the previously ranked carriers in the order of increasing value of γ, as indicated at step 509. At step 511, module 316 determines whether the last carrier (i.e., n=N) has gone through the pre-ranking process. If the last carrier has been ranked, process 500 then comes to an end. Otherwise, module 316 selects the next carrier (i.e., n=n+1) at step 513, and returns to step 503 previously described.

Referring now to FIG. 6, in carrier insertion process 600, the 1-th ranked carrier from process 500 is added to the subset S of carriers consisting of 1 through (l−1)-th ranked carriers, as indicated at step 603, where l=1 initially (i.e., in the first run, the subset S consists of the first ranked carrier only). Transmission of the carriers in the subset S together with the host analog FM signal is emulated at step 604. At step 605 module 316 performs an interference analysis of the emulated transmission, taking into account the precancelation effect of the subset of carriers on the FM signal. Based on the interference analysis, module 316 at step 607 computes the value of $\gamma_{aggregate}$ corresponding to the subset of carriers. At step 611, module 316 determines whether the value of $\gamma_{aggregate}$ exceeds that of $\gamma_{max}$. If $\gamma_{aggregate}>\gamma_{max}$, i.e., the aggregate degradation greater the maximum acceptable degradation, which is not allowed, process 600 is prepared to exit. Specifically, the l-th ranked carrier just added to the subset S is eliminated therefrom, as indicated at step 613, and process 600 comes to an end.

Otherwise if $\gamma_{aggregate} \leqq \gamma_{max}$, module 316 determines at step 615 whether the last ranked carrier has been added to the subset (i.e., l=N). If l=N, process 600 again comes to an end. Otherwise, module 316 selects the next higher ranked carrier (i.e., l=l+1) at step 617, and returns to step 603 previously described.

Since, in practice, processes 500 and 600 take certain time to run, for synchronization purposes, the corresponding delay is introduced to the analog signal transmission using delay element 311 described above. However, this delay can be significantly shortened if parallel processing is applied. For example, by using parallel processing, module 316 can compute the respective γ's in process 500 in parallel.

Figure 7:
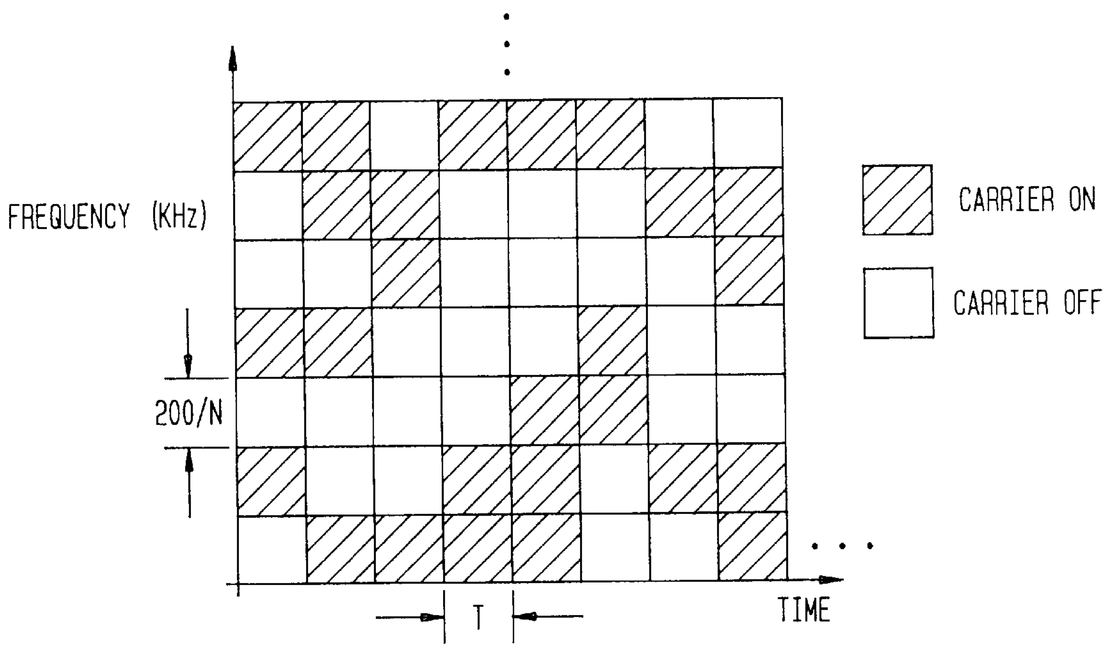
FIG. 7 illustratively charts the carriers selected for digital transmission during each transmission interval.

FIG. 7 illustratively charts the results of a simulation where the above insertion algorithm was applied. Each column in FIG. 7 is associated with a transmission interval T. That is, the first column is associated with the first transmission interval; the second column is associated with the second transmission interval; and so on and so forth. Each box in a column represents the status of a carrier in modem 303 requiring a subband of 200/N KHz during a given frame. A selected carrier is indicated by a shaded box. As shown in FIG. 7, during each transmission interval, only a subset of the carriers are selected. In addition, the carriers in the subset vary adaptively with time.

It should be pointed out at this juncture that since the carriers selected by carrier insertion module 316 vary from frame to frame, a control channel is required to convey information about the selected carriers to the receiver, which is described hereinbelow. Specifically, the receiver needs to be informed of which particular carriers are on or off during each frame. For conveying such information, control channel 401 in FIG. 4 is reserved outside the analog signal spectrum. In addition, control channel processor 319 is employed to generate one-bit information per carrier per frame (i.e., N bits per transmission interval) to be transmitted over control channel 401.

As an alternative to the above control channel arrangement, it will be appreciated that a person skilled in the art may use a limited control channel arrangement where when certain carriers are always on or off, no control information is transmitted for those carriers, or when carriers are turned on or off as a group, only one bit per frame is transmitted for that group of carriers. Other possibilities include use of an adaptive control channel arrangement where a different control channel is used depending on the type of the data communicated (e.g., a conversation, a pause, music, etc.).

Figure 8:
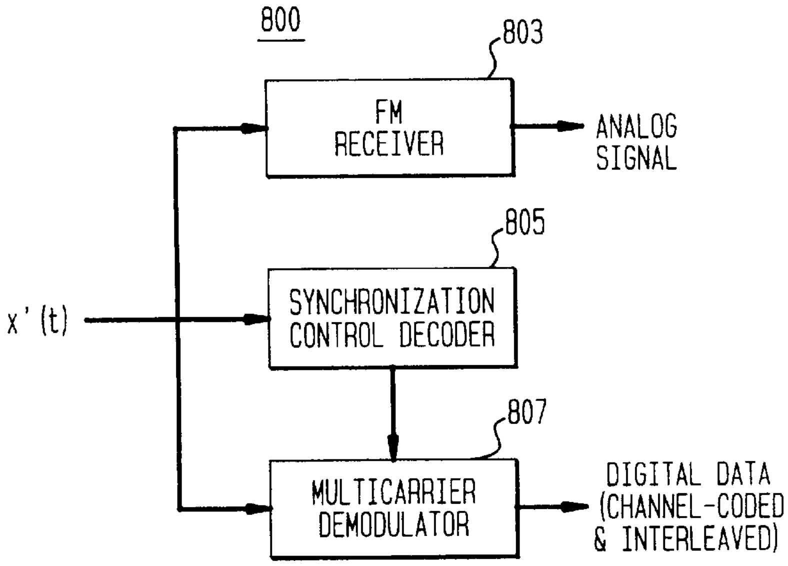
FIG. 8 is a block diagram of a receiver for receiving the digitally modulated and analog FM signals from the transmitter of FIG. 3.

FIG. 8 illustrates receiver 800 for receiving from the FM frequency band a composite signal x'(t) corresponding to x(t) and the control channel information generated at transmitter 300. Because of the precancelation performed at the transmitter in accordance with the invention, the design of receiver 800 is advantageously simple. As mentioned before, FM receiver 803 in receiver 800 is of conventional design and, in a standard way recovers the original analog signal. Synchronization control decoder 805 decodes the control channel information in x'(t) to identify the selected carriers used for digital transmission in each transmission interval. The identities of the carriers are conveyed to demodulator 807. With the knowledge of the selected carriers, demodulator 807 performs the inverse function to modulator 303 on x'(t) to recover therefrom the digital data, albeit channel-coded and interleaved.

The foregoing merely illustrates the principles of the invention. It will thus be appreciated that those skilled in the art will be able to devise numerous other schemes which embody the principles of the invention and are thus within its spirit and scope.

For example, it will be appreciated that a person skilled in the art will apply the inventive precanceling scheme with a variety of standard digital modulation techniques including, for example, MPSK and MQAM techniques.

Figure 9A:
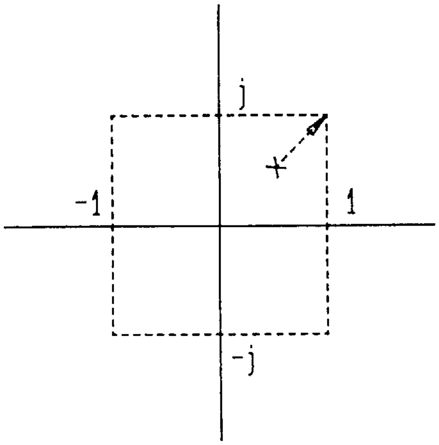
FIGS. 9A–9C respectively depict three possible scenarios where the precancelation scheme in accordance with the invention may or may not be needed.
Figure 9B:
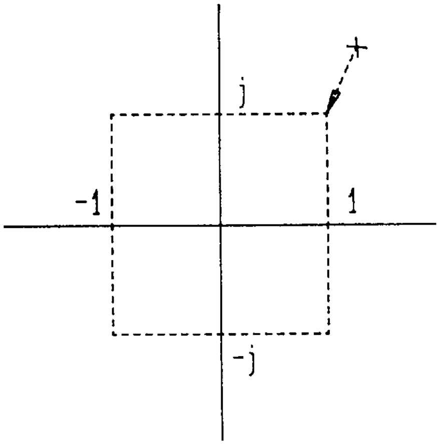
Figure 9C:
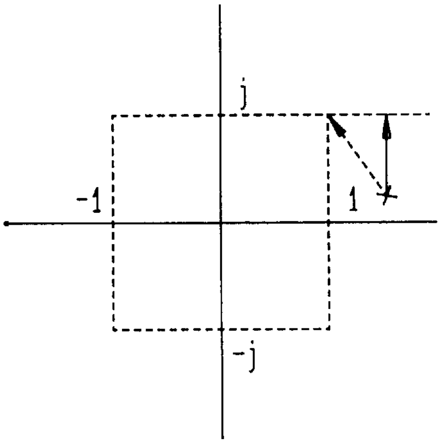

Moreover, the precanceling scheme described above may be selectively applied. Under certain situations, precancelation may not be necessary. One such situation is demonstrated here where a well-known QPSK constellation is used for generating data symbols. FIGS. 9A through 9C respectively show three possible scenarios where we assume that the symbol transmitted was at 1+j.

In the scenario of FIG. 9A, without precancelation, the received symbol in the absence of noise is indicated by "x" inside the square whose corners are marked by the four possible symbols. Since the received symbol is closer to the decision boundaries than 1+j which is the intended symbol, the effective SNR of this received symbol has been lowered. Precancelation in this case effectively moves the symbol in the direction of the dashed arrow to the position 1+j to regain the desired SNR.

In the scenario of FIG. 9B, however, the effective SNR of the received symbol without precanceling is higher than that of 1+j. Since precancelation would reduce the SNR of the received symbol, and possibly introduce additional distortion to the host FM signal, we may want to refrain from applying precancelation in this case.

In the scenario of FIG. 9C, even though precancelation is necessary in this case, the precancelation described above moves the received symbol in the direction of the dashed arrow to the position of 1+j. However, such precancelation is inferior to the one that, for example, moves the received symbol in the direction of the solid arrow shown in FIG. 9C. The precancelation represented by the solid arrow further improves the SNR of the symbol, and possibly the host FM signal distortion.

Figure 10A:
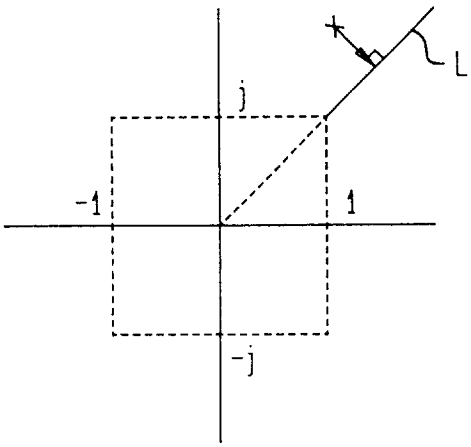
FIGS. 10A and 10B respectively depict two possible scenarios where an improved precancelation scheme in accordance with the invention is applicable.
Figure 10B:
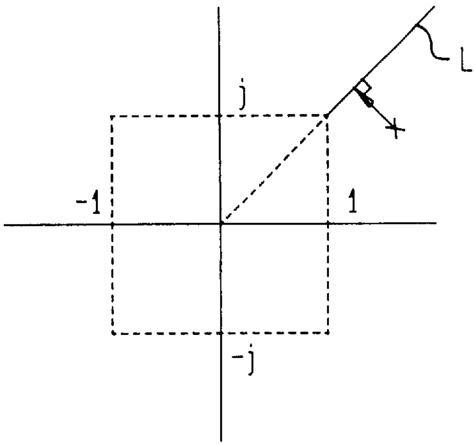

Based on the above observation and the disclosure heretofore, it will be appreciated that a person skilled in the art will devise other precanceling schemes which may be more immune to carrier recovery errors than the present scheme. For example, an improved precanceling scheme is depicted here in FIGS. 10A and 10B where the scheme is applied to the scenarios of FIGS. 9B and 9C, respectively. As shown in FIGS. 10A and 10B, the improved precancelation moves the received symbol "x" in the direction of the solid arrow perpendicularly to a solid line denoted L. Line L is an extension of the dashed line emanating from the origin of the constellation, and extends outwardly from the point 1+j. Lines involving other symbols in the constellation can be formed in a similar manner. However, the received symbol is translated onto the closest line, which is L in this instance, with the minimum Euclidean distance (i.e., perpendicularly to the line). To minimize intersymbol interference in case of incorrect sampling instants, we may limit the amplitude of the translated symbol by limiting the length of line L. It should be noted that this improved precanceling scheme is applicable to digital transmission not only involving QPSK, but also other constellations, such as MPSK, MQAM, PAM, and multidimensional constellations. In the case of MPSK, the improved precanceling scheme can be applied to all signal points therein, while in the case of MQAM, the improved precanceling scheme should be selectively applied to the outer signal points therein.

Figure 11:
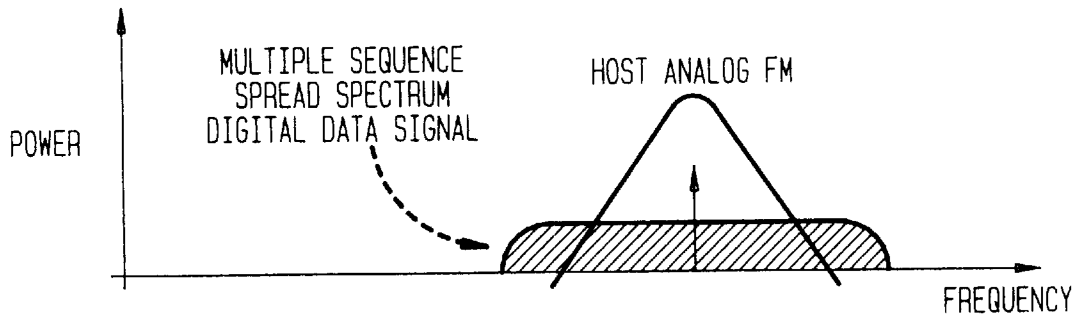
FIG. 11 illustrates a composite power spectrum of a host analog FM signal and a multiple sequence spread spectrum signal in a first direct sequence code division multiple access (DSCDMA) system in accordance with the invention.

In addition, the disclosed precanceling scheme can be applied to digital signaling based on direct sequence code division multiple access (DSCDMA) sequences, which are of the type commonly used in cellular mobile radio downlink (base-to-mobile) transmission. In accordance with the DSCDMA scheme, a direct sequence spread spectrum signal is obtained by multiplying a slowly varying data signal and a fast varying spreading sequence. The sequence is a pseudo-noise code known to the receiver. For example, by using the so-called "Walsh" functions, orthogonal spread spectrum signals are generated on the same carrier. FIG. 11 shows an IBOC scheme where digital spectrum signals are generated on the host carrier. Since all sequences are originated from the same site, coordination by means of Walsh functions is feasible.

Figure 12:
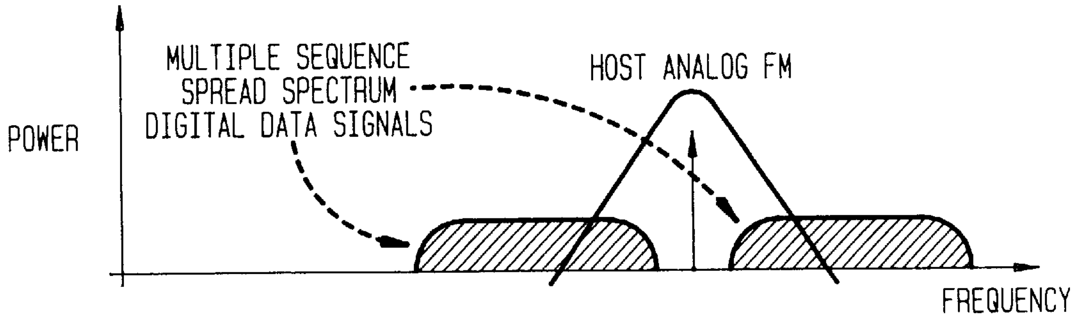
FIG. 12 illustrates a composite power spectrum of a host analog FM signal and two multiple sequence spread spectrum signals in a second DSCDMA system in accordance with the invention.

FIG. 12 shows another example where Walsh functions are applied to two subcarriers individually to generate two groups of spread spectrum signals. These two groups of signals are frequency orthogonal to each other. As shown in FIG. 12, the spectra of the two groups of signals partially overlap the spectrum of the host analog FM signal.

The disclosed precanceling scheme for the multicarrier system needs only to be slightly modified when it is applied to a direct sequence spread spectrum system. The modification involves the change of $h_n(t)$ to $\xi_n(t)$, where $\xi_n(t)$ represents a component spreading signal based on the standard spreading code and Walsh functions. The insertion algorithm for the multicarrier system is also applicable to the direct sequence spread spectrum system. One advantage of the multicarrier system over the DSCDMA system is that the former can populate close to the edges of the 200 KHz band most of the time, especially when the analog message rate is low, resulting in a temporarily small frequency deviation.

It will be appreciated that based on the above disclosure that the inventive precanceling scheme is applicable to a DSCDMA system, a person skilled in the art will similarly apply the inventive technique to orthogonal frequency hopping (FH) systems.

In addition, although in the disclosed embodiment, a particular digitally modulated signal which is linearly modulated is simulcast with an analog FM signal which is non-linearly modulated, the invention broadly applies to a simulcast of any linearly modulated signals with any non-linearly modulated signals.

Figure 1:
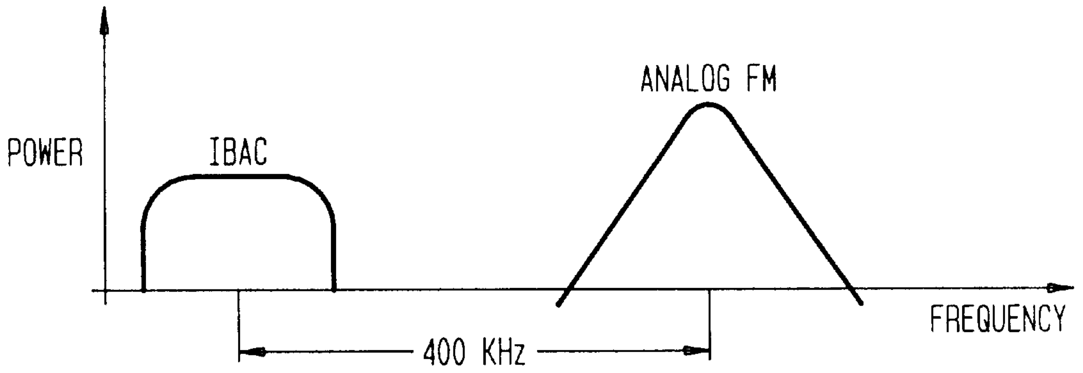
FIG. 1 (PRIOR ART)
FIG. 1 illustrates the relative power and location of an in band adjacent channel (IBAC) scheme to an analog FM carrier in the frequency domain in prior art.
Figure 2:
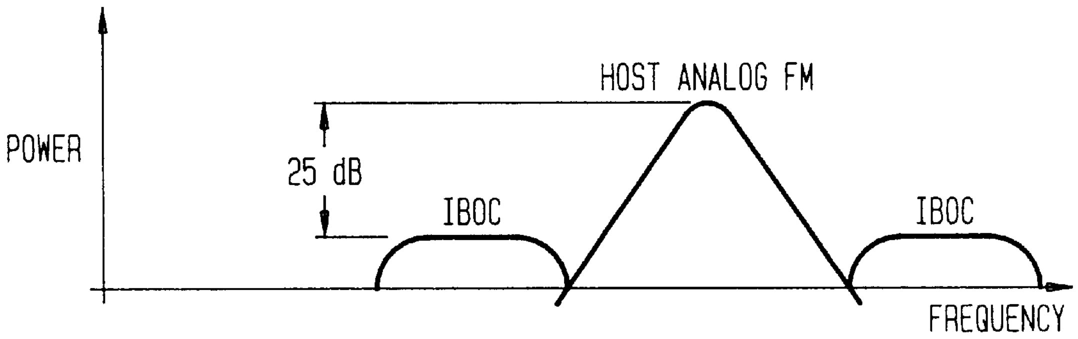
FIG. 2 (PRIOR ART)
FIG. 2 illustrates the relative power and locations of in band on channel (IBOC) scheme to a host analog FM carrier in the frequency domain in prior art.

Finally, the disclosed precanceling scheme is also applicable to the prior art IBOC scheme of FIG. 2. In an IBOC system, precancelation of the analog FM signal spectral tail provides at least two benefits to the digital receiver. The performance of the digital receiver improves since any interference from the analog signal has been eliminated. As a result, for given digital reception quality, a lower transmitting power for digitally modulated signals may be used. In addition, the performance of the digital receiver can be readily determined since it is independent of the host analog FM signal. More importantly, the digital data rate in such an IBOC system can be increased, as the digital carriers can be inserted closer to the analog host carrier.

We claim:

1. Apparatus for communicating over a frequency band first information represented by a first signal and second information represented by a second signal comprising:

a controller for combining said second signal and a third signal derived from at least a waveform of said first signal to generate a combined signal; and a transmit element for simultaneously transmitting said first signal and said combined signal over said frequency band, said third signal taking into account effects of said first signal on said combined signal when said first signal and said combined signal are simultaneously transmitted.

2. The apparatus of claim 1 wherein said first information includes analog data and second information includes digital data.

3. The apparatus of claim 2 wherein said first signal includes an analog frequency-modulated (FM) signal, and said second signal includes a digitally modulated signal.

4. The apparatus of claim 3 wherein said frequency band is allocated for transmission of FM signals.

5. The apparatus of claim 1 further comprising a multicarrier modem for generating a plurality of tones, and a selector for selecting one or more of said plurality of tones to be included in said second signal.

6. The apparatus of claim 5 wherein said one or more of said plurality of tones selected for said second signal vary with time.

7. The apparatus of claim 1 further comprising a generator for generating said second signal in accordance with a direct sequence code division multiple access (DSCDMA) scheme.

8. The apparatus of claim 7 wherein said second signal includes one or more groups of spread spectrum signals.

9. The apparatus of claim 1 wherein said second signal populates a plurality of channels outside a substantial portion of a spectrum of said first signal in a frequency domain.

10. Apparatus for communicating over a frequency band first information represented by a first signal and second information represented by a second signal comprising:

- a selector for selecting said second signal from a plurality of signals applicable to representing said second information;
- a controller responsive to said first signal for modifying said second signal; and
- a transmit element for simultaneously transmitting said first signal and the modified second signal over said frequency band, said second signal being selected to reduce effects of said modified second signal on said first signal when said first signal and said modified second signal are simultaneously transmitted.

11. The apparatus of claim 10 wherein said first information includes analog data and second information includes digital data.

12. The apparatus of claim 11 wherein said first signal includes an analog FM signal, and said second signal includes a digitally modulated signal.

13. The apparatus of claim 12 wherein said frequency band is allocated for transmission of FM signals.

14. The apparatus of claim 10 further comprising a multicarrier modem for generating said plurality of signals, wherein said second signal includes a subset of said plurality of signals.

15. The apparatus of claim 14 wherein the selector ranks each individual one of said plurality of signals according to effects of the individual signal on said first signal when said individual signal and said first signal are simultaneously transmitted over said frequency band.

16. The apparatus of claim 15 wherein said subset is selected as a function of ranks of individual signals in said subset and aggregate effects thereof on said first signal when said individual signals in said subset and said first signal are simultaneously transmitted over said frequency band.

17. A communications system for communicating over a frequency band first information represented by a first signal and second information represented by a second signal comprising:

- a transmitter comprising:
  - a selector for selecting said second signal from a plurality of signals applicable to representing said second information;
  - a controller responsive to said first signal for modifying the selected second signal;
  - a first transmit element for simultaneously transmitting said first signal and the modified second signal over said frequency band, said second signal being selected to reduce effects of said modified second signal on said first signal when said first signal and said modified second signal are simultaneously transmitted; and
  - a second transmit element for transmitting a control signal indicative of a presence of said selected second signal; and
- a receiver comprising:
  - a first receive element for recovering said first information; and
  - a second receive element responsive to at least said control signal for recovering said second information.

18. The system of claim 17 wherein said first information includes analog data and second information includes digital data.

19. The system of claim 18 wherein said first signal includes an analog FM signal, and said second signal includes a digitally modulated signal.

20. The system of claim 17 wherein said frequency band is allocated for transmission of FM signals.

21. A method for communicating over a frequency band first information represented by a first signal and second information represented by a second signal comprising:

- generating a third signal based on at least a waveform of said first signal;
- combining said second signal and said third signal to generate a combined signal; and
- simultaneously transmitting said first signal and said combined signal over said frequency band, said third signal taking into account effects of said first signal on said combined signal when said first signal and said combined signal are simultaneously transmitted.

22. The method of claim 21 wherein said first information includes analog data and second information includes digital data.

23. The method of claim 22 wherein said first signal includes an analog FM signal, and said second signal includes a digitally modulated signal.

24. The method of claim 23 wherein said frequency band is allocated for transmission of FM signals.

25. The method of claim 21 further comprising generating a plurality of tones, and selecting one or more of said plurality of tones to be included in said second signal.

26. The method of claim 25 wherein said one or more of said plurality of tones selected for said second signal vary with time.

27. The method of claim 21 further comprising generating said second signal in accordance with a DSCDMA scheme.

28. The method of claim 27 wherein said second signal includes one or more groups of spread spectrum signals.

29. The method of claim 21 wherein said second signal populates a plurality of channels outside a substantial portion of a spectrum of said first: signal in a frequency domain.

30. A method for communicating over a frequency band first information represented by a first signal and second information represented by a second signal comprising:

- selecting said second signal from a plurality of signals applicable to representing said second information;
- modifying said second signal in response to said first signal; and
- simultaneously transmitting said first signal and the modified second signal over said frequency band, said second signal being selected to reduce effects of said modified second signal on said first signal when said first signal and said modified second signal are simultaneously transmitted.

31. The method of claim 30 wherein said first information includes analog data and second information includes digital data.

32. The method of claim 31 wherein said first signal includes an analog FM signal, and said second signal includes a digitally modulated signal.

33. The method of claim 32 wherein said frequency band is allocated for transmission of FM signals.

34. The method of claim 30 further comprising generating said plurality of signals, wherein said second signal includes a subset of said plurality of signals.

35. The method of claim 34 further comprising ranking each individual one of said plurality of signals according to effects of the individual signal on said first signal when said individual signal and said first signal are simultaneously transmitted over said frequency band.

36. The method of claim 35 wherein said subset is selected as a function of ranks of individual signals in said subset and aggregate effects thereof on said first signal when said individual signals in said subset and said first signal are simultaneously transmitted over said frequency band.

37. A method for communicating over a frequency band first information represented by a first signal and second information represented by a second signal comprising:

selecting said second signal from a plurality of signals applicable to representing said second information;

modifying the selected second signal in response to said first signal;

simultaneously transmitting said first signal and the modified second signal over said frequency band, said second signal being selected to reduce effects of said modified second signal on said first signal when said first signal and said modified second signal are simultaneously transmitted;

transmitting a control signal indicative of a presence of said selected second signal;

recovering said first information; and recovering said second information in response to at least said control signal.

38. The method of claim 37 wherein said first information includes analog data and second information includes digital data.

39. The method of claim 38 wherein said first signal includes an analog FM signal, and said second signal includes a digitally modulated signal.

40. The method of claim 37 wherein said frequency band is allocated for transmission of FM signals.

* * * * *